US009327846B2

(12) United States Patent
Lake et al.

(10) Patent No.: US 9,327,846 B2
(45) Date of Patent: May 3, 2016

(54) FLEET PERFORMANCE OPTIMIZATION TOOL ENHANCEMENT

(75) Inventors: Peter J. Lake, Auburn, WA (US); Jay K. McCullough, Belleville, IL (US); Steven D. Chapman, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 641 days.

(21) Appl. No.: 12/821,896

(22) Filed: Jun. 23, 2010

(65) Prior Publication Data

US 2011/0320168 A1    Dec. 29, 2011

(51) Int. Cl.
*G06F 15/00* (2006.01)
*B64F 5/00* (2006.01)
*G06Q 10/06* (2012.01)

(52) U.S. Cl.
CPC ............ *B64F 5/0045* (2013.01); *G06Q 10/063* (2013.01)

(58) Field of Classification Search
CPC ............................. G05B 23/02; G06Q 10/063
USPC .......................................................... 702/183
See application file for complete search history.

(56) References Cited

U.S. PATENT DOCUMENTS

| 7,580,847 B2 | 8/2009 | Black et al. | |
| 2003/0137194 A1* | 7/2003 | White et al. | 307/10.1 |
| 2007/0198222 A1* | 8/2007 | Schuster et al. | 702/187 |
| 2007/0198679 A1 | 8/2007 | Duyanovich et al. | |
| 2007/0200703 A1 | 8/2007 | Baker et al. | |
| 2007/0241908 A1* | 10/2007 | Coop | 340/572.8 |
| 2008/0021604 A1 | 1/2008 | Bouvier et al. | |
| 2008/0154458 A1 | 6/2008 | Brandstetter et al. | |
| 2009/0276438 A1 | 11/2009 | Lake et al. | |
| 2009/0312897 A1* | 12/2009 | Jamrosz et al. | 701/29 |

FOREIGN PATENT DOCUMENTS

| EP | 1895452 A1 | 3/2008 |
| WO | 2008151240 A1 | 12/2008 |

OTHER PUBLICATIONS

U.S. Appl. No. 12/569,642, filed Sep. 29, 2009.
U.S. Appl. No. 12/620,598, filed Nov. 18, 2009.
EP Search Report of Application No. GB1109923.1; Oct. 12, 2011; 9 pages.
A GB Search & Exam Report, dated Oct. 14, 2013, for co-pending application No. GB1109923.1.
GB Examination Report for related application GB1109923.1 dated Jan. 29, 2013; 6 pp.

(Continued)

*Primary Examiner* — Patrick Assouad
*Assistant Examiner* — Haidong Zhang
(74) *Attorney, Agent, or Firm* — Armstrong Teasdale LLP

(57) ABSTRACT

Methods and systems are provided for enhancing performance of a system that includes a plurality of components. A server is coupled to a scanning device that is configured to scan a first component of the plurality of components for an identifier that uniquely identifies the first component. The server receives, from the scanning device, an identification of the first component of the plurality of components. The server also determines an operating parameter that is uniquely related to the first component, compares the operating parameter to a predefined baseline for the first component, and determines whether the first component is a rogue component.

19 Claims, 6 Drawing Sheets

(56) References Cited

OTHER PUBLICATIONS

GB Examination Report for related application GB1109923.1 dated Oct. 29, 2014; 6 pp.

GB Examination Report for related application GB1109923.1 dated Jun. 20, 2014; 3 pp.

GB Examination Report for related application GB1109923.1 dated Dec. 10, 2014; 2 pp.

GB Examination Report for related application GB1109923.1 dated Feb. 19, 2015; 2 pp.

* cited by examiner

Shop Data for Selected Component

Alert View ─────────────────────────────────────────── Data View

| Received | FFD | Text | Suspect | MFR Part No | Serial No ▼ | Aircraft |
|---|---|---|---|---|---|---|
| 2004-08-08 | NO TROUBLE FOUND | HAS DIRTY LIGHT PANEL AND KNOBS, WRONG PN ON THE P... | | 7123-19973-03AB | 99107116 | xxx005N |
| 2005-04-27 | FAILED TEST | THE LIGHT PANEL HAS CHIPPED PAINT AND HAS 8B19973... | | 7123-19973-03AB | 99107116 | xxx001N |
| 2005-09-16 | NO TROUBLE FOUND | NO VISUAL EXTERNAL PROBLEMS WITH THE UNIT, THE P.O... | | 7123-19973-03AB | 99107116 | xxx012N |
| 2007-11-16 | FAILED TEST | THE PO LIST THE HS P/N INSTEAD OF THE NORD MICRO P... | | 7123-19973-03AB | 99107116 | xxx003N |
| 2006-12-02 | FAILED TEST | HAS CHIPPED PAINT ON LIGHT PANEL, DIRTY KNOBS LIG... | | 7123-19973-03AB | 99107103 | xxx024N |
| 2005-06-27 | FAILED TEST | RECEIVED WITH DIRTY KNOBS AND LIGHT PANEL, LOOSE PR... | | 7123-19973-03AB | 99094805 | xxx005N |
| 2005-09-09 | FAILED TEST | NO VISUAL EXTERNAL PROBLEMS WITH THE UNIT, THE P.O... | | 7123-19973-03AB | 99094805 | xxx048N |

Export Data

FIG. 4

Component Data Filter

Fleet: [▼]  Text Filter: [____]  Data View: [Operator ▼]

● Component ID  ○ Description

Components

Export Data

| Component ID▲ | Component ID | TCA | NFF | SI | RMV | CX | FEX | DLY |
|---|---|---|---|---|---|---|---|---|
| 2131144031 | CNTRL AUTO PRSZN (ANLOG/DIGTL) [EQUIP NO: M00325/M... | 86% | N/A | 6 | 91 | 0 | 0 | 6 |
| 2131368051 | PANEL PRSZN CONT [EQUIP NO: P005-06/P00506]... | 90% | 20% | 6 | 131 | 0 | 0 | 6 |
| 2131420401 | RELAY PRSZN OUTFL VALVE CLOSD [EQUIP NO: M00324-K1... | N/A | N/A | 0 | 1 | 0 | 0 | 0 |
| 2131420692 | RELAY ACOND PRSZN CONT LCD LGHTN CONT [EQUIP NO: R... | N/A | N/A | 0 | 1 | 0 | 0 | 0 |
| 2131576012 | VALVE PRES CONT HEAT CONT FWD OUTFL [EQUIP NO: V00... | N/A | N/A | 0 | 9 | 0 | 0 | 0 |
| 2131576341 | VALVE ACOND PRES CONT OUTFL [EQUIP NO: V00048] | 93% | N/A | 0 | 59 | 0 | 0 | 0 |
| 2131576382 | VALVE PRSZN RELEF (BLOUT/SAFTY/POSIV) | 67% | 67% | 1 | 3 | 0 | 0 | 1 |
| 2131284011 | INDR CABIN PRES ROC [EQUIP NO: N00055] | 67% | N/A | 0 | 9 | 0 | 0 | 0 |
| 2131284051 | INDR ALTM AND DFNTL PRES (DPI) [EQUIP NO: N00051] | N/A | N/A | 0 | 8 | 0 | 0 | 0 |
| 2131522041 | SW CABIN PRES (ALT) WARNG [EQUIP NO: S00128/S01172... | N/A | N/A | 0 | 6 | 0 | 0 | 0 |

Component Count: 10

FIG. 5

FLEET PERFORMANCE OPTIMIZATION TOOL ENHANCEMENT

A portion of the disclosure of this patent document contains material which is subject to copyright protection. The copyright owner has no objection to the reproduction of the patent document as it appears in the U.S. Patent and Trademark Office patent file or records, but otherwise reserves all copyrights.

BACKGROUND

The subject matter described herein relates generally to quality control and, more particularly, to methods and systems for use in identifying a rogue component to facilitate enhancing the performance of a system.

Known aircraft generally include a plurality of systems including a plurality of components. Often, such systems use refurbished components that have cycled through assembly, operation, disassembly, and repair. Health monitoring of such aircraft and its associated components may be essential to maintaining system performance and availability.

Typically, components are scheduled for maintenance based on a preselected number of operation hours or cycles. The preselected number typically is conservatively selected based on numerous factors including past experiences with that particular type of component. If a component fails, a predetermined diagnosis routine is followed to identify and replace the failed component.

However, because of the volume of such aircraft systems and/or components, monitoring each of the systems and/or components may be a time-consuming and/or tedious task. To ease some of the monitoring requirements, at least some observed issues have been historically addressed using anecdotal methods. For example, one known method for managing health monitoring data includes an adhoc investigation of such observed issues.

BRIEF DESCRIPTION

In one aspect, a method is provided for enhancing performance of a system that includes a plurality of components. The method includes identifying a first component of the plurality of components, determining an operating parameter that is uniquely related to the first component, comparing the operating parameter to a predefined baseline for the first component, and determining whether the first component is a rogue component.

In another aspect, a server is provided for enhancing performance of a system that includes a plurality of components. The server includes a memory device and a processor coupled to the memory device and is programmed to identify a first component of the plurality of components, determine an operating parameter that is uniquely related to the first component, compare the operating parameter to a predefined baseline for the first component, and determine whether the first component is a rogue component.

In yet another aspect, a system is provided for enhancing performance of a system that includes a plurality of components. The system includes a scanning device and a server coupled to the scanning device. The scanning device is configured to scan a first component of the plurality of components for an identifier that uniquely identifies the first component. The server includes a memory device and a processor coupled to the memory device and is programmed to receive, from the scanning device, an identification of the first component of the plurality of components, determine an operating parameter that is uniquely related to the first component, compare the operating parameter to a predefined baseline for the first component, and determine whether the first component is a rogue component.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

FIGS. 4-7 are exemplary screenshots that may be presented to a user using the system shown in FIG. 2.

DETAILED DESCRIPTION

The subject matter described herein relates generally to methods and systems for use in enhancing quality control. More particularly, the subject matter described herein relates to methods and systems for identifying a rogue component to facilitate enhancing performance of a system that includes a plurality of components. In one embodiment, a scanning device scans a first component of the plurality of components for an identifier that uniquely identifies the first component. A server receives, from the scanning device, an identification of the first component of the plurality of components, determines an operating parameter that is uniquely related to the first component, compares the operating parameter to a predefined baseline for the first component and determines whether the first component is a rogue component. As such, each unique component is tracked over time to readily identify rogue components.

An exemplary technical effect of the methods and systems described herein includes at least one of: (a) scan a first component of the plurality of components for an identifier that uniquely identifies the first component; (b) identify the first component; (c) determine an operating parameter that is uniquely related to the first component; (d) compare the operating parameter to a predefined baseline for the first component; (e) determine whether the first component is a rogue component; (f) predict a potential failure of the first component based on the operating parameter; (g) generate an alert based on the determination that indicates that the first component is a rogue component; (h) determine an availability of the first component; (i) recommend at least one action step for the first component; and (j) rank order the first component among the plurality of components based on the operating parameter.

As used herein, an element or step recited in the singular and proceeded with the word "a" or "an" should be understood as not excluding plural elements or steps unless such exclusion is explicitly recited. Furthermore, references to "one embodiment" of the present invention are not intended to be interpreted as excluding the existence of additional embodiments that also incorporate the recited features.

Figure 1:
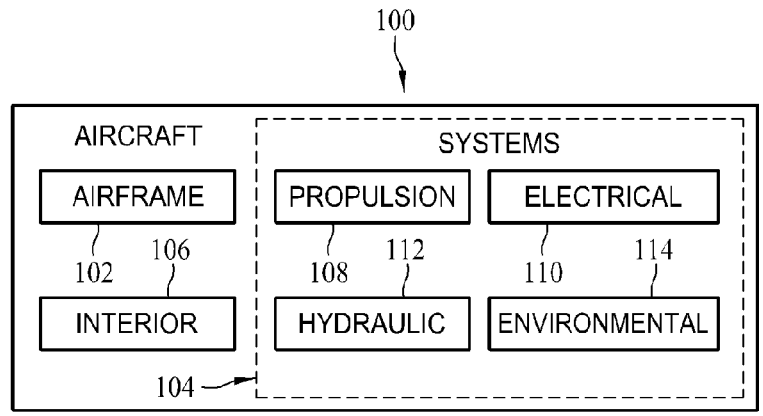
FIG. 1 is a schematic illustration of an exemplary aircraft including a plurality of components.

Referring to the figures, exemplary embodiments of the disclosure are described in the context of an aircraft 100 as shown in FIG. 1. In the exemplary embodiment, aircraft 100 includes an airframe 102 and an interior 106. Moreover, in the exemplary embodiment, aircraft 100 includes a plurality of operational systems 104 that each includes at least one component (not shown). In the exemplary embodiment, systems 104 may include a propulsion system 108, an electrical system 110, a hydraulic system 112, and/or an environmental system 114. Any number of other systems may be included without deviating from the present invention. For example, although an aerospace system is shown, the principles of the disclosure may be applied to other industries, such as the automotive industry.

Figure 2:
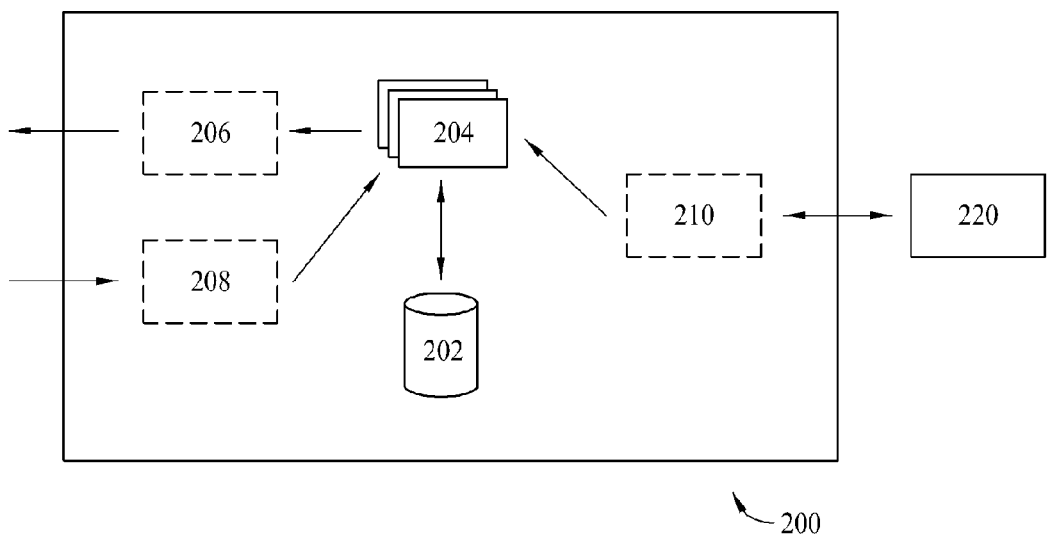
FIG. 2 is a schematic illustration of an exemplary system that may be used to identify a rogue component to facilitate enhancing performance of the aircraft shown in FIG. 1.

FIG. 2 illustrates an exemplary identification system 200 that may be used to identify a rogue component (not shown) to facilitate enhancing a performance of aircraft 100 and, more specifically, of at least one system 104 (shown in FIG. 1). More specifically, in the exemplary embodiment, system 200 enables rogue components to be selectively discarded, selectively replaced, and/or selectively maintained as reliable components. As used herein, the term "rogue" component refers to a component having a history that deviates in operation and/or in function from a typical or standard component.

In the exemplary embodiment, system 200 includes a memory device 202 and a memory device 204 that is coupled to memory device 202 for executing instructions. In some embodiments, executable instructions and/or health management data, such as flight statistics, mechanic log books, serialized part numbers, and/or service dates, for aircraft 100 are stored in memory device 202. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits.

System 200, in the exemplary embodiment, is configurable to perform one or more operations described herein by programming memory device 204. For example, memory device 204 may be programmed by encoding an operation as one or more executable instructions and by providing the executable instructions in memory device 202. Memory device 204 may include one or more processing units (e.g., in a multi-core configuration).

In the exemplary embodiment, memory device 202 includes one or more devices (not shown) that enable information, such as executable instructions and/or other data, to be selectively stored and retrieved. In the exemplary embodiment, such data may include, but is not limited to, health management data such as repair order data, replacement order data, and/or maintenance order data. Memory device 202 may also include one or more computer readable media, such as, without limitation, dynamic random access memory (DRAM), static random access memory (SRAM), a solid state disk, and/or a hard disk. Moreover, memory device 202 may be configured to store, without limitation, executable instructions and/or any other type of data.

In the exemplary embodiment, system 200 includes a presentation interface 206 that is coupled to memory device 204 for presenting information to a user. For example, presentation interface 206 may include a display adapter (not shown) that may couple to a display device (not shown), such as, without limitation, a cathode ray tube (CRT), a liquid crystal display (LCD), a light-emitting diode (LED) display, an organic LED (OLED) display, and/or an "electronic ink" display. In some embodiments, presentation interface 206 includes one or more display devices. In addition to, or in the alternative, presentation interface 206 may be coupled to, and/or include, a printer.

System 200, in the exemplary embodiment, includes an input interface 208 for receiving input from the user. For example, in the exemplary embodiment, input interface 208 receives information suitable for use with the methods described herein. Input interface 208 is coupled to memory device 204 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 206 and as input interface 208.

In the exemplary embodiment, system 200 includes a communication interface 210 that is coupled to memory device 204. In the exemplary embodiment, communication interface 210 communicates with a remote device (not shown). For example, communication interface 210 may use, without limitation, a wired network adapter, a wireless network adapter, and/or a mobile telecommunications adapter. Alternatively or additionally, system 200 may be coupled to the remote device via a network (not shown). Such a network may include, without limitation, the Internet, a local area network (LAN), a wide area network (WAN), a wireless LAN (WLAN), a mesh network, and/or a virtual private network (VPN) or other suitable communication means.

In the exemplary embodiment, system 200 is coupled to a scanning device 220 via communication interface 210. Scanning device 210 scans a target object or component for an identifier (not shown) that uniquely identifies the component. Exemplary identifiers may include, but are not limited to, a barcode, a magnetic stripe, a microchip, a radiofrequency identification tag, and a digitized photo.

Figure 3:
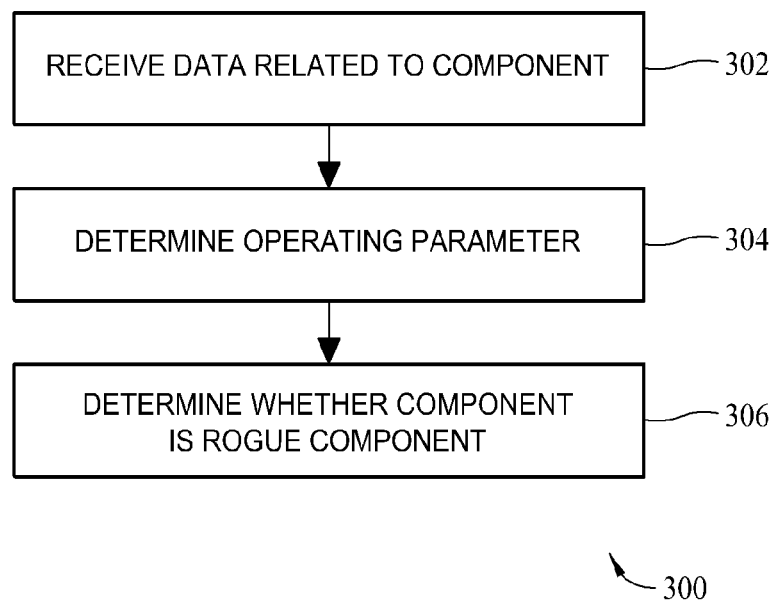
FIG. 3 is a flow chart illustrating an exemplary method for identifying a rogue component using the system shown in FIG. 2.

FIG. 3 illustrates an exemplary method 300 for use in identifying a rogue component to facilitate enhancing performance of aircraft 100 and, more specifically, systems 104 coupled with and/or associated with aircraft 100 (shown in FIG. 1). FIGS. 4-7 illustrate exemplary screenshots that may be presented to a user on presentation interface 206. During use, system 200 presents, such as displays, complex, voluminous health management data in an easy-to-understand forma that includes actionable information. More specifically, system 200 alerts a user when a rogue component may cause decreased availability of aircraft 100.

Initially, health management data for aircraft 100 is stored in memory device 202 (shown in FIG. 2). Such health management data may include, but is not limited to, flight statistics, mechanic log books, serialized part numbers, and/or service dates associated with aircraft 100 and/or is associated components. In the exemplary embodiment, scanning device 220 receives 302 health management data related to at least one component. More specifically, in the exemplary embodiment, scanning device 220 scans at least one component to locate an identifier, such as a serialized part number, that uniquely identifies that particular component to enable a history of health management data (shown in FIG. 4) to be accumulated for that particular component. For example, scanning device 220 may be used to scan a first component when that component is removed from aircraft 100 and to then rescan that component when the first component is replaced or coupled to aircraft 100. As such, system 200 maintains health management data that is associated with each unique component.

In the exemplary embodiment, identifying information 402 for at least one component is presented on presentation interface 206, and selecting the first component causes a query to be generated regarding the first component. For example, in the exemplary embodiment, identifying information 402 is a "Component ID." In one embodiment, the query initiates the retrieval, from memory device 202, of health management data related to the first component. More specifically, in the exemplary embodiment, health management data enables an operating parameter that is unique to the first component to be determined 304 based on the health management data. Such operating parameters may include, but are not limited to, an average operating lifetime, a failure rate, and/or a deviation from a baseline. In one embodiment, the baseline is not unique to the component, but rather is representative of a typical or standard component for that particular type of component, that is, an average parameter for the component make and/or model.

Based on at least the health management data, the determined operating parameter, and/or a comparison of such data to predefined baseline data, system 200 determines 306 whether the first component is a rogue component. In one embodiment, a component having a deviation of greater than 50% from the baseline is determined to be a rogue component. More specifically, in the exemplary embodiment, components having a deviation of greater than or equal to 50% from the baseline are determined to be rogue components, while components having a deviation between 25% and 50% from the baseline are flagged as intermediate components, and components having a deviation less than 25% from the baseline are determined to be compliant components or in compliance. Notably, such ranges may be selectively adjusted and/or weighted to accommodate varying user preferences.

In the exemplary embodiment, presentation interface 206 generates an alert when a component is determined 306 to be a rogue component. More specifically, as shown in FIG. 5, presentation interface 206 displays an icon 404 next to at least one component, wherein the size, shape, and/or color of the icon is indicative of a severity of deviation. Such an icon enables a user to easily identify and to focus on rogue and/or intermediate components.

In one embodiment, health management data is available to the user and/or usable on a real-time or substantially instantaneous basis to facilitate providing accurate and/or updated information related to at least one component. In such an embodiment, system 200 determines an availability of a serialized component using real-time information based on at least the stored health management data, including flight data, maintenance data, and/or inventory data, for the serialized component. Where the serialized component is not available, system 200 may also be configured to provide and/or identify a substantially similar component for use and/or operation based on health management data.

In the exemplary embodiment, system 200 may recommend to the user at least one action step for the serialized component based on the health management data of the serialized component and/or other components having a similar history of health management data. In the exemplary embodiment, health management data for aircraft 100 and, more specifically, system 104 may be aggregated, and the components are rank ordered. More specifically, in the exemplary embodiment, the components are rank ordered based on the respective deviation from the predefined baseline. As such, system 200 enables the user to address the components based on a severity of deviation.

Figure 6:
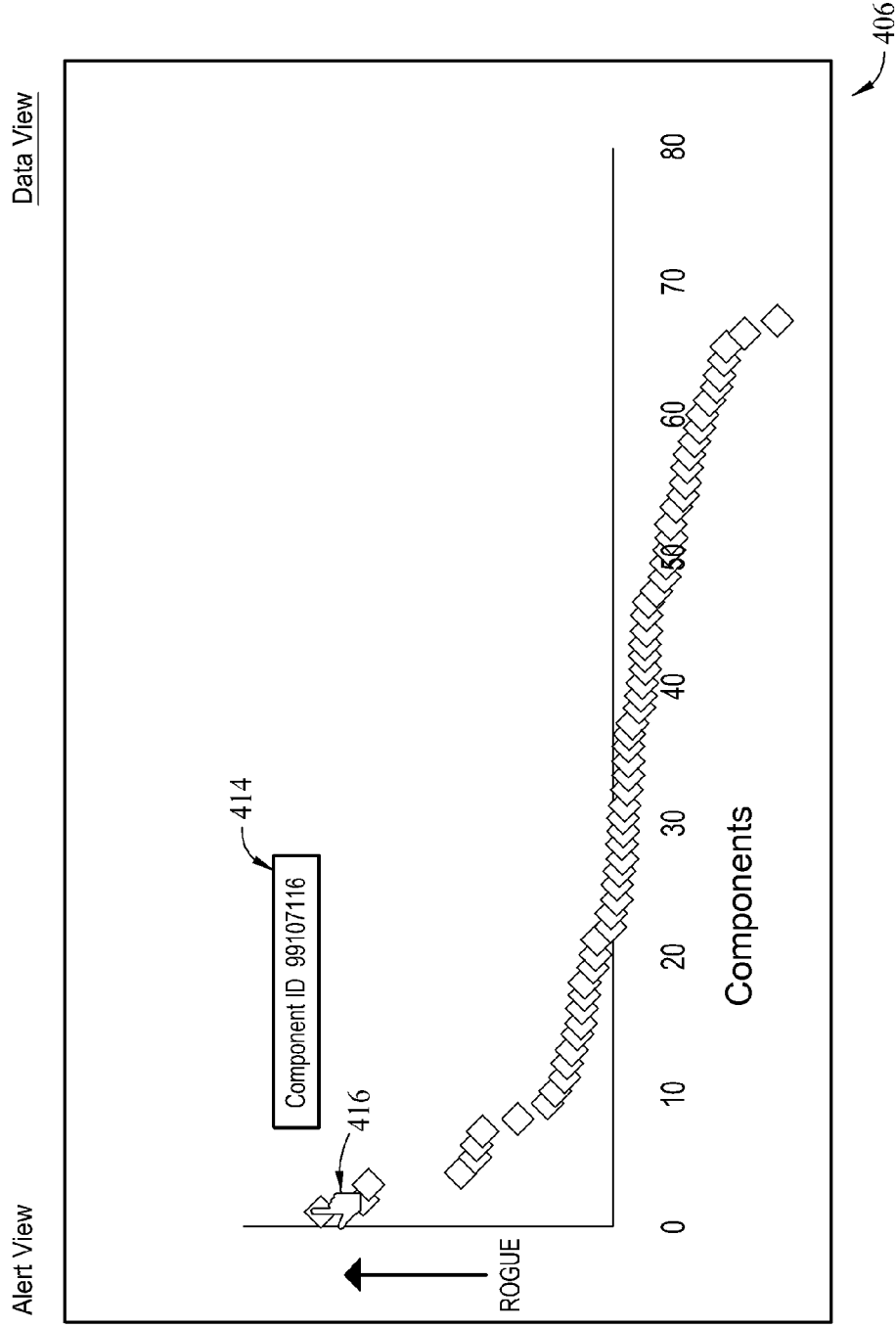
Figure 7:
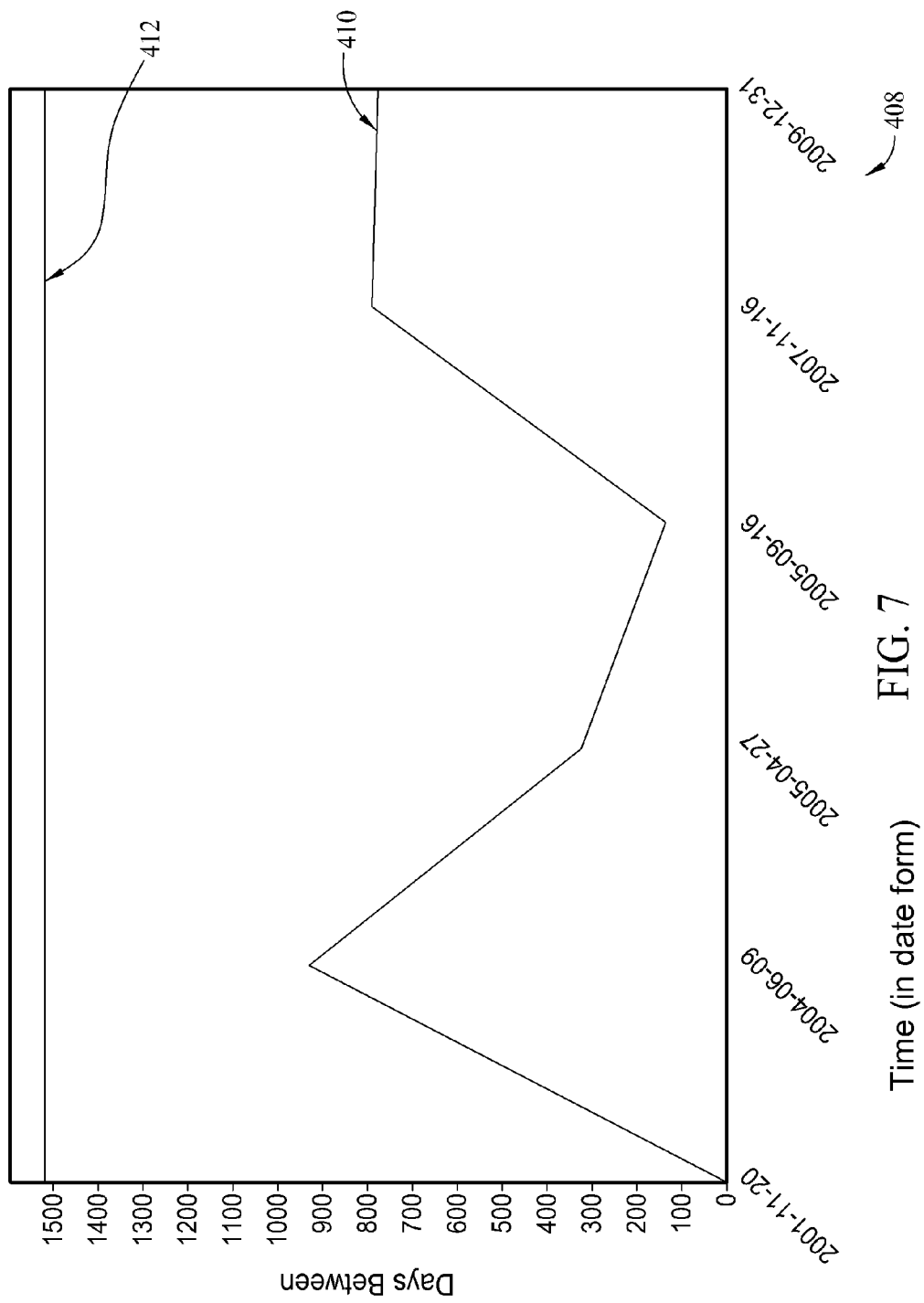

Each icon, in the exemplary embodiment, is selectable to display a graphical representation of the health management data, such as, without limitation, a removal lifetime, an operating lifetime, an average removal lifetime, an average operating lifetime, a failure rate, and/or a deviation from the baseline, for the selected component. Such graphical representations may include, but are not limited to, pie charts, bar charts, line charts, scatter plots, time series charts, high-low-open-close charts, candlestick plots, Gantt charts, combined plots, thermometers, and/or dials. For example, FIG. 6 illustrates an exemplary scatter plot 406 for an average operating lifetime of a plurality of components. In another example, FIG. 7 illustrates an exemplary time series chart 408 for a lifetime history 410 of the first component relative to a predefined baseline 412. In one embodiment, the graphical representation is an interactive web-based applet that enables the user to selectively focus in on only a portion of the graphical representation. For example, as shown in FIG. 6, a field 414, including a component ID, is presented when cursor 416 is selectively positioned over the scatter plot point.

In one embodiment, system 200 provides a forecast for at least one component based on health management data. As such, the health management data is analyzed such that a prediction for the at least one component may be estimated and/or calculated. For example, system 200 may provide probabilities for component removal and/or schedule interruption based on the health management data and/or the operating parameter. For another example, system 200 may calculate an estimated projected or remaining lifetime for the first component based on other components that have had a similar history of health management data. Moreover, system 200 may recommend to the user at least one action step for the first component based on other components having a similar history of health management data.

The embodiments described herein present historical and/or projected health management data for at least one component to a user. More specifically, the exemplary methods and systems enable a rogue component to be identified to facilitate selectively discarding rogue components and/or selectively maintaining reliable components. For example, system 200 may determine if an installed component and/or a replacement component has a history of poor performance. In addition, system 200 may be used in conjunction with an inventory control system, a shop induction evaluation, or a supplier warranty administration. As such, the exemplary methods and systems facilitate extending a useful lifespan of such aircraft systems, decreasing maintenance costs associated with such aircraft systems, and/or improving safety of such aircraft systems.

The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the present invention, including the best mode, and also to enable any person skilled in the art to practice those certain embodiments, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of enhancing performance of an aircraft system that includes a plurality of components, said method comprising:
   identifying a first component of the plurality of components;

determining an operating parameter that is uniquely related to the first component;

comparing, using a processor of a server, the operating parameter to a predefined baseline, wherein the baseline is not unique to the first component and is representative of a standard component of a same type as the first component; and determining, using the processor of the server, whether the first component is a rogue component by:

determining, based on the comparison between the operating parameter and the baseline, a deviation between the operating parameter and the baseline; and determining the first component is a rogue component when the deviation is greater than a predetermined threshold.

2. A method in accordance with claim 1, wherein identifying a first component further comprises scanning the first component for an identifier that uniquely identifies the first component.

3. A method in accordance with claim 1 further comprising generating an alert that indicates that the first component is a rogue component.

4. A method in accordance with claim 1 further comprising determining an availability of the first component.

5. A method in accordance with claim 1 further comprising recommending at least one action step for the first component.

6. A method in accordance with claim 1 further comprising rank ordering the first component among the plurality of components based on the operating parameter.

7. A method in accordance with claim 1, further comprising displaying an icon that is indicative of a severity of the deviation.

8. A method in accordance with claim 1, wherein comparing the operating parameter to a baseline comprises comparing the operating parameter to a baseline that is an average parameter for components of the same type as the first component.

9. A server for enhancing performance of a system that includes a plurality of components, said server comprising a memory device and a processor coupled to the memory device, said server programmed to:

identify a first component of the plurality of components;

determine an operating parameter that is uniquely related to the first component;

compare the operating parameter to a predefined baseline, wherein the baseline is not unique to the first component and is representative of a standard component of a same type as the first component; and determine whether the first component is a rogue component by:

determining, based on the comparison between the operating parameter and the baseline, a deviation between the operating parameter and the baseline; and determining the first component is a rogue component when the deviation is greater than a predetermined threshold.

10. A server in accordance with claim 9, wherein said server is coupled to a scanning device configured to scan the first component for an identifier that uniquely identifies the first component.

11. A server in accordance with claim 9, wherein said server is further programmed to generate an alert that indicates that the first component is a rogue component.

12. A server in accordance with claim 9 wherein said server is further programmed to determine an availability of the first component.

13. A server in accordance with claim 9, wherein said server is further programmed to recommend at least one action step for the first component.

14. A server in accordance with claim 9, wherein said server is further programmed to rank order the first component among the plurality of components based on the operating parameter.

15. A system for enhancing performance of a system that includes a plurality of components, said system comprising:

a scanning device that is configured to scan a first component of the plurality of components for an identifier that uniquely identifies the first component; and a server coupled to said scanning device, said server comprising a memory device and a processor coupled to the memory device, wherein said server is programmed to:

receive, from said scanning device, an identification of the first component of the plurality of components;

determine an operating parameter that is uniquely related to the first component;

compare the operating parameter to a predefined baseline, wherein the baseline is not unique to the first component and is representative of a standard component of a same type as the first component; and determine whether the first component is a rogue component by:

determining, based on the comparison between the operating parameter and the baseline, a deviation between the operating parameter and the baseline; and determining the first component is a rogue component when the deviation is greater than a predetermined threshold.

16. A system in accordance with claim 15, wherein said server is further programmed to generate an alert that indicates that the first component is a rogue component.

17. A system in accordance with claim 15 wherein said server is further programmed to determine an availability of the first component.

18. A system in accordance with claim 15, wherein said server is further programmed to recommend at least one action step for the first component.

19. A system in accordance with claim 15, wherein said server is further programmed to rank order the first component among the plurality of components based on the operating parameter.

* * * * *